Patented Mar. 11, 1952

2,588,997

UNITED STATES PATENT OFFICE 2,588,997

2,3,4,4,5,5-HEXACHLORO-2-CYCLOPENTEN-ONE INSECTICIDAL COMPOSITIONS

Edmund B. Towne and Hubert M. Hill, Rochester, N. Y., assignors to Eastman Kodak Company, Rochester, N. Y., a corporation of New Jersey No Drawing. Application December 20, 1949, Serial No. 134,134

5 Claims. (Cl. 167—30)

This invention relates to compositions useful for insecticidal purposes. More specifically, the invention is concerned with insecticidal compositions containing 2,3,4,4,5,5-hexachloro-2-cyclopentenone, together with a carrier therefor.

Compounds to be of value for insecticidal purposes should ordinarily be light-stable, compatible with light paraffinic mineral oils, free from harmful effects to plants, free of a tendency to stain walls, fabrics, etc., and be not offensive to human beings.

Many of the insecticides which are known at the present time are either short-lived in effectiveness or have other characteristics which prevent those insecticides from being of general application.

One object of our invention is to provide insecticidal compositions which are highly toxic to insects but are of low toxicity to man and other warm-blooded animals. Another object of our invention is to provide insecticidal compositions which are simple to use but are highly effective against the various insects which are of a destructive nature, such as to plant life, foodstuffs, or textile materials. A further object of our invention is to provide 2,3,4,4,5,5-hexachloro-2-cyclopentenone in a form in which it is useful for combating harmful insect life. Other objects of our invention will appear herein.

We have found that 2,3,4,4,5,5-hexachloro-2-cyclopentenone is a particularly effective and highly active insecticidal material. This compound may be prepared by any of the methods disclosed in the art. For instance, the preparation of this compound is disclosed in an article by Newcomer and McBee in the Journal of the American Chemical Society, vol. 71 page 946, March 1949. The compound and its preparation is also disclosed in Richter's Organic Chemistry, vol. 2, page 58. By incorporating this compound in a carrier therefor an insecticidal composition is obtained which is effective against the common insect pests, the destruction of which is desirable.

The insecticidal value of 2,3,4,4,5,5-hexachloro-2-cyclopentenone is shown by various tests carried out by contacting insects therewith. For instance, by preparing a dust of 2,3,4,4,5,5-hexachloro-2-cyclopentenone and an inert carrier, such as pyrophyllite, and after placing fruit flies in a bottle, sprinkling the flies with the dust and observing them at intervals, it may be seen that 100% kill of those fruit flies is obtained in a short time. Another method of determining the effectiveness of this compound as an insecticide is to dip a piece of filter paper into a solution of the compound in an organic solvent, and, after allowing the paper to dry, placing it in a jar containing fruit flies. 100% kill is obtained in a short time. The insecticidal compositions in accordance with our invention are effective against various other insect pests, such as house flies, silverfish, bean beetles, flea beetles, cucumber beetles, aphids, red spiders, and other mites, thrips, etc.

The proportion of 2,3,4,4,5,5-hexachloro-2-cyclopentenone which is employed in insecticidal compositions in accordance with our invention may be varied over a substantial range, such as 0.5–10%. For instance, insects having little or no protective covering are readily susceptible to the effect of this compound and, thus, even as little as 0.5% thereof would be effective. Ordinarily, however, a higher percentage of this compound is desirable, being most useful in the proportion of 2–10% of 2,3,4,4,5,5-hexachloro-2-cyclopentenone in the composition. If desired, however, other insecticidal materials may be used either as an additive or to displace part of the 2,3,4,4,5,5-hexachloro-2-cyclopentenone which is employed in the insecticidal composition. For instance, materials having insecticidal properties, such as pyrethrum, rotenone, nicotine, calcium or lead arsenate, paradichlorobenzene or the like may be incorporated in the compositions in accordance with our invention. Also, fungicidal materials, such as lime-sulfur, sulfur, Bordeaux mixture, mercury compounds or the like may be included in compositions in accordance with our invention. It may sometimes be desirable to incorporate synergists in compositions in accordance with our invention, some compounds of this type being piperonyl butoxide, piperonyl propoxide, and piperonyl butyl carbitol oxide. Although the proportion of synergist employed is not critical, the most desirable proportions thereof are ordinarily within the range of 0.5–2%.

We have found that for dusting purposes 2,3,4,4,5,5-hexachloro-2-cyclopentenone is quite effective if pyrophyllite is employed as the carrier therefor. We have found, also, that for spray purposes petroleum distillates are particularly effective as solvents in preparing insecticidal compositions in accordance with our invention, particularly petroleum distillates having a boiling range of 80–150° C. We have found that when kerosene is employed as a solvent, proportions of 2,3,4,4,5,5-hexachloro-2-cyclopentenone as little as 1 part to 1000 parts of kerosene result in a kill of 100% in one-half hour when employed on fruit flies. Also, 2,3,4,4,5,5-hexachloro-2-cyclopentenone is effective in other proportions, such as 1:500, 1:100 or proportions intermediate thereof.

If it is desired to apply 2,3,4,4,5,5-hexachloro-2-cyclopentenone as an aerosol, the carrier therefor should be dichlorodifluoromethane, preferably in conjunction with the refined petroleum distillate.

The following examples illustrate compositions in accordance with our invention which are particularly effective for insecticidal purposes:

*Example 1.*—The following composition is particularly effective for use as aerosol in which a propelling liquid is present:

| | Per cent |
|---|---|
| 2,3,4,4,5,5-hexachloro-2-cyclopentenone | 2-5 |
| Refined petroleum distillate | 12-15 |
| Inert propellant, such as dichlorodifluoromethane or methyl chloride | 85 |

*Example 2.*—The following is an example of an insecticidal composition in which other materials having insecticidal properties are incorporated:

| | Per cent |
|---|---|
| 2,3,4,4,5,5-hexachloro-2-cyclopentenone | 2 |
| Pyrethrin extract | 0.2 |
| Piperonyl butoxide | 1.0 |
| Petroleum distillate | 12 |
| Inert propellant | 84.8 |

*Example 3.*—Instead of using a propellant the composition of 2,3,4,4,5,5-hexachloro-2-cyclopentenone in a petroleum distillate is emulsified in water by means of an emulsifying agent as, for example, whale oil soap, ordinary soap, sodium lauryl sulfate or the like to form a liquid useful for spraying.

*Example 4.*—A particularly effective insecticidal dusting compound is obtained by incorporating 5-10% of 2,3,4,4,5,5-hexachloro-2-cyclopentenone in 90-95% of pyrophyllite in finely divided form.

We claim:
1. A method of destroying insects which comprises applying to their environment in distributed form, 2,3,4,4,5,5-hexachloro-2-cyclopentenone.
2. An insecticidal composition comprising an insecticidal proportion of 2,3,4,4,5,5-hexachloro-2-cyclopentenone and a refined petroleum distillate.
3. An insecticidal composition comprising an insecticidal proportion of 2,3,4,4,5,5-hexachloro-2-cyclopentenone and finely divided pyrophyllite.
4. An insecticidal composition comprising 5-10% of 2,3,4,4,5,5-hexachloro-2-cyclopentenone and 90-95% of dry, finely divided pyrophyllite.
5. An insecticidal composition comprising 2,3,4,4,5,5-hexachloro-2-cyclopentenone, piperonyl butoxide and petroleum distillate.

EDMUND B. TOWNE.
HUBERT M. HILL.

REFERENCES CITED

The following references are of record in the file of this patent:

UNITED STATES PATENTS

| Number | Name | Date |
|---|---|---|
| 2,010,841 | Bender | Aug. 13, 1935 |
| 2,378,597 | ter Horst | June 19, 1945 |

OTHER REFERENCES

McAllister et al., J. Econ. Ent., Dec. 1947, pp. 906-909.

Kearns et al., J. Econ. Ent., Feb. 1949, pp. 127-134.

Soap and Sanitary Chemicals, Apr. 1949, p. 87.

Van Brederode et al., Rec. Trav. Chim., vol. 65, pp. 174-183 (1946).